(12) United States Patent
Kim et al.

(10) Patent No.: US 11,252,389 B2
(45) Date of Patent: Feb. 15, 2022

(54) ELECTRONIC APPARATUS FOR CORRECTING COLOR TEMPERATURE OF CAPTURED IMAGE USING REFERENCE COLOR INFORMATION CORRESPONDING TO EXTERNAL OBJECT, AND METHOD FOR CONTROLLING ELECTRONIC APPARATUS

(71) Applicant: Samsung Electronics Co., Ltd., Gyeonggi-do (KR)

(72) Inventors: Su Hee Kim, Gyeonggi-do (KR); Jong Hyon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 16/605,260

(22) PCT Filed: Apr. 13, 2018

(86) PCT No.: PCT/KR2018/004315
§ 371 (c)(1),
(2) Date: Oct. 15, 2019

(87) PCT Pub. No.: WO2018/194318
PCT Pub. Date: Oct. 25, 2018

(65) Prior Publication Data
US 2021/0144352 A1 May 13, 2021

(30) Foreign Application Priority Data

Apr. 17, 2017 (KR) .................. 10-2017-0049368

(51) Int. Cl.
*H04N 9/73* (2006.01)
*G06K 9/00* (2022.01)
(Continued)

(52) U.S. Cl.
CPC ......... *H04N 9/735* (2013.01); *G06K 9/00664* (2013.01); *H04N 5/2351* (2013.01); *H04N 5/23206* (2013.01); *H04N 9/07* (2013.01)

(58) Field of Classification Search
CPC ....................................................... H04N 9/375
(Continued)

(56) References Cited

U.S. PATENT DOCUMENTS

| 6,594,384 B1 | 7/2003 | Kim et al. |
| 7,068,840 B2 | 6/2006 | Risson |

(Continued)

FOREIGN PATENT DOCUMENTS

| JP | 2001-186540 A | 7/2001 |
| JP | 2005-286548 A | 10/2005 |

(Continued)

OTHER PUBLICATIONS

Korean Search Report dated Dec. 9, 2021.

*Primary Examiner* — Joel W Fosselman
(74) *Attorney, Agent, or Firm* — Cha & Reiter, LLC

(57) ABSTRACT

Disclosed is an electronic apparatus comprising: a camera module; a communication module; and a processor electrically connected to the camera module and the communication module, wherein the processor is capable of: obtaining an image of one or more external objects by using the camera module; recognizing at least one specified external object among the one or more external objects; transmitting image color information, corresponding to said at least one recognized specified external object, to an external electronic apparatus via the communication module; receiving (Continued)

attribute information on a light source for the image, determined using reference color information, corresponding to said at least one specified external object, and the image color information, from the external electronic apparatus; and correcting the color temperature of the image by using the attribute information received from the external electronic apparatus. Other various embodiments identified in the description are possible.

15 Claims, 12 Drawing Sheets

(51) Int. Cl.
*H04N 5/232* (2006.01)
*H04N 5/235* (2006.01)
*H04N 9/07* (2006.01)

(58) Field of Classification Search
USPC .................................................. 348/207.99
See application file for complete search history.

(56) References Cited

U.S. PATENT DOCUMENTS

| | | | |
|---|---|---|---|
| 9,007,484 | B2 | 4/2015 | Zhang et al. |
| 9,189,700 | B2 | 11/2015 | Lee |
| 9,288,374 | B1* | 3/2016 | Cooper ................... H04N 5/232 |
| 9,420,247 | B2 | 8/2016 | Jung et al. |
| 9,665,789 | B2 | 5/2017 | Lee |
| 2003/0095704 | A1 | 5/2003 | Risson |
| 2013/0093917 | A1 | 4/2013 | Zhang et al. |
| 2014/0044361 | A1 | 2/2014 | Lee et al. |
| 2016/0086048 | A1 | 3/2016 | Lee |
| 2017/0310884 | A1* | 10/2017 | Li ........................ H04N 5/23222 |

FOREIGN PATENT DOCUMENTS

| | | |
|---|---|---|
| JP | 2011-078137 A | 4/2011 |
| JP | 10-2005-0108687 A | 9/2015 |
| KR | 2001-0046716 A | 6/2001 |
| KR | 2001-0054460 A | 7/2001 |
| KR | 10-2011-0054145 A | 5/2011 |
| KR | 10-1215948 B1 | 12/2012 |
| WO | 2012/115332 A1 | 8/2012 |

* cited by examiner

ELECTRONIC APPARATUS FOR CORRECTING COLOR TEMPERATURE OF CAPTURED IMAGE USING REFERENCE COLOR INFORMATION CORRESPONDING TO EXTERNAL OBJECT, AND METHOD FOR CONTROLLING ELECTRONIC APPARATUS

CROSS REFERENCE TO RELATED APPLICATIONS

This application is a National Phase Entry of PCT International Application No. PCT/KR2018/004315, which was filed on Apr. 13, 2018, and claims a priority to Korean Patent Application No. 10-2017-0049368, which was filed on Apr. 17, 2017, the contents of which are incorporated herein by reference.

TECHNICAL FIELD

Embodiments disclosed in the disclosure relate to a technique for correcting an image.

BACKGROUND ART

An electronic device including a camera may generate a digital image of a photographed subject and correct the generated image. Image signal processing (ISP) technology for generating an image by photographing a subject in an electronic device has mainly developed not only for generating an image but also for correcting the generated image.

The color of the image generated by the electronic device may vary depending on the brightness of external lighting compared to the original color. When the color temperature of a light source is low, the image is reddish in overall. To the contrary, when the color temperature of the light source is high, the image is bluish in overall.

DISCLOSURE

Technical Problem

However, when the object included in an image does not include any achromatic color, it may be difficult to obtain a gain value for correcting a white balance.

In addition, in order to recognize various colors as well as achromatic colors included in an image by an electronic device, a database for storing information about various colors is required and various color information must be processed. Thus, it is difficult to apply a technology for recognizing various colors to an existing electronic device in which there are limitations in size and storage capacity of hardware.

Various embodiments of the present disclosure provide an electronic device for recognizing a specified external object and generating a gain value for correcting a color temperature of an image through a color included in the external object, and a control method of the electronic device.

Technical Solution

An aspect of the present disclosure provides an electronic device that includes a camera module, a communication module, and a processor electrically connected to the camera module and the communication module, wherein the processor may obtain an image of one or more external objects by using the camera module, recognize at least one specified external object among the one or more external objects, transmit image color information corresponding to the recognized at least one specified external object to an external electronic device through the communication module, receive, from the external electronic device, attribute information of a light source for the image determined by using the image color information and reference color information corresponding to the at least one specified external object, and correct a color temperature of the image by using the attribute information received from the external electronic device.

An another aspect of the present disclosure provides a method of correcting a color temperature of an image that includes obtaining an image of one or more external objects by using a camera module, recognizing at least one specified external object among the one or more external objects, transmitting image color information corresponding to the recognized at least one specified external object to a server through a communication module, receiving, from the external electronic device, attribute information of a light source for the image determined by using the image color information and reference color information corresponding to the at least one specified external object, and correcting a color temperature of the image by using the attribute information.

An still another aspect of the present disclosure provides an electronic device that includes a camera module, and a processor electrically connected to the camera module, wherein the processor may obtain an image of one or more external objects by using the camera module, recognize at least one specified external object among the one or more external objects, determine attribute information of a light source for the image by using image color information corresponding to the recognized at least one specified external object and reference color information corresponding to the at least one specified external object, and correct the image color temperature by using the attribute information.

Advantageous Effects

According to the embodiment of the present disclosure, the electronic device may recognize the specified external object and obtain the attribute information of the light source for the obtained image by comparing the color information of the recognized external object with reference color information. By obtaining a gain value for correcting the color temperature of an image by using the attribute information of the light source, an image whose color information is changed by a light source may be corrected as an image photographed with the reference light source even when a specific color is not recognized. The electronic device may obtain the gain value more clearly for correcting the color temperature of the obtained image by recognizing a plurality of specified external objects.

In addition, when the specified external object is recognized and the attribute information of the light source for the obtained image is obtained, the electronic device may use the information about the accumulated external object and the light source in the database of the server, thereby obtaining the gain value for correcting quickly and clearly the color temperature of the image.

In addition, various effects that are directly or indirectly understood through the present disclosure may be provided.

DESCRIPTION OF DRAWINGS

With regard to description of drawings, the same or similar elements may be marked by the same or similar reference numerals.

MODE FOR INVENTION

Figure 1:
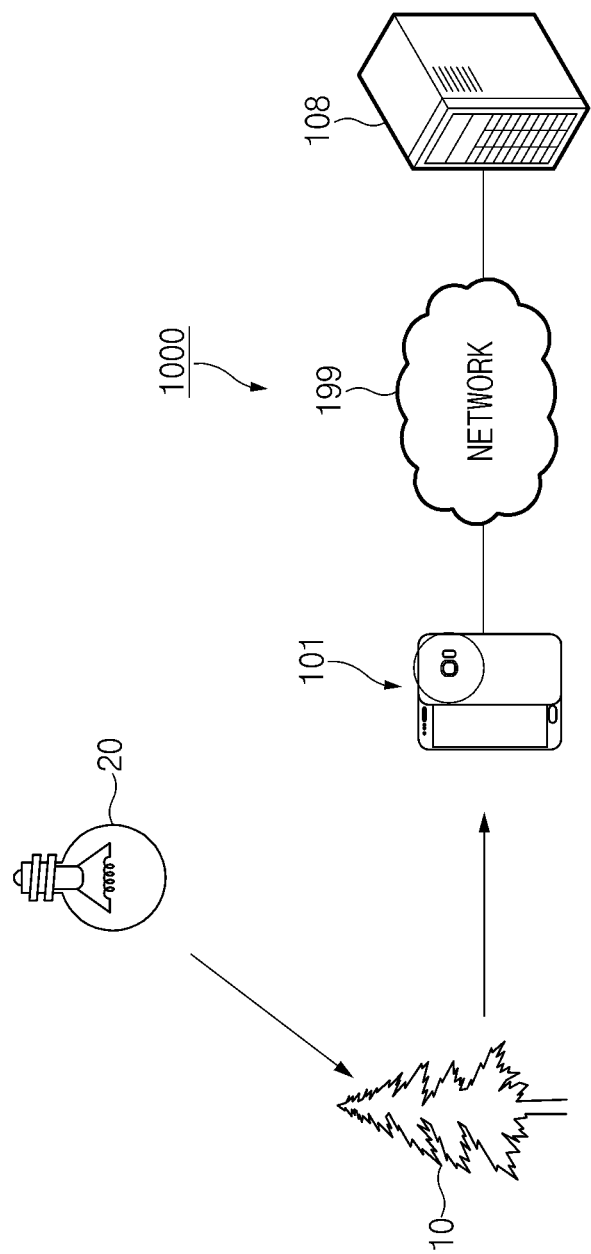
FIG. 1 is a view illustrating an image processing system according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

FIG. 1 is a view illustrating an image processing system according to various embodiments.

Referring to FIG. 1, an image processing system 1000 may include an electronic device 101 and an external electronic device (or a server) 108. The electronic device 101 and the server 108 may be connected to each other through a network 199.

The electronic device 101 may obtain an image by photographing one or more external objects 10. For example, the electronic device 101 may obtain an image by receiving light emitted from a light source 20 and reflected from the surface of the external object 10.

The light source 20 may be able to emit light in different colors according to a type of the light source. For example, the light source 20 may have a different color temperature according to the type. In addition, the light source 20 may have different luminescent spectral intensities according to wavelength bands, and may have different spectral distributions according to types.

The external object 10 is an object (or subject) to be photographed and may include one or more colors on the surface of the external object 10. For example, the external object 10 may include different surface spectral reflectances according to colors included in the external object 10.

According to an embodiment, the electronic device 101 may have different camera spectral sensitivities depending on the types of the camera module. Thus, the image information (e.g., an RGB value) obtained by the electronic device 101 may be calculated by following Equation 1.

$$R = k * \int L(\lambda) * R(\lambda) * \bar{r}(\lambda) d\lambda$$

$$G = k * \int L(\lambda) * R(\lambda) * \bar{g}(\lambda) d\lambda$$

$$B = k * \int L(\lambda) * R(\lambda) * \bar{b}(\lambda) d\lambda \qquad \text{[Equation 1]}$$

In Equation 1, R, G, and B may be R values, G values, and B values of the obtained image. The L (λ) is the spectral intensity according to the wavelength of the light source 20. The R (λ) may be a surface spectral reflectance of an external object. The $\bar{r}(\lambda)$, $\bar{g}(\lambda)$ and $\bar{b}(\lambda)$ may be the camera spectral sensitivity of the camera module of the electronic device 101. The k may be a normalization constant.

The image of the external object 10 may be generated differently according to the spectral intensity of the light source 20 and the camera spectral sensitivity of the camera module as well as the surface spectral reflectance of the external object 10. The user may differently recognize the external object 10 recognized directly and the external object 10 recognized through the generated image. Accordingly, the electronic device 101 is required to correct the obtained image so that the user may recognize the external image 10 like directly recognizing the external object 10.

According to an embodiment of the present disclosure, the electronic device 101 may transmit color information of the acquired image to the external electronic device 108. For example, the electronic device 101 may transmit the color information of the external object 10 included in the image to the external electronic device 108 to obtain information about the image (e.g., information about a light source). The color information may be, for example, an RGB (red-green-blue) value, a YUV value, or a YCbCr value, which includes three values, or an RGBW (red-green-blue-white) value including four values. Alternatively, the values may be cyan-magenta-yellow-black (CMYK) values or five values including cyan and magenta values in addition to RGB values.

According to an embodiment, the external electronic device 108 may generate information about the received image. For example, the external electronic device 108 may generate attribute information of the light source 20 for the received image. According to an embodiment of the present disclosure, the external electronic device 108 may transmit the generated attribute information of the light source 20 to the electronic device 101.

According to an embodiment of the present disclosure, the electronic device 101 may correct an image by using information about the received image. For example, the electronic device 101 may correct the color temperature of the image using the attribute information of the light source. Accordingly, the electronic device 101 may generate the same image as the user directly recognizes the external object 10.

Figure 2:
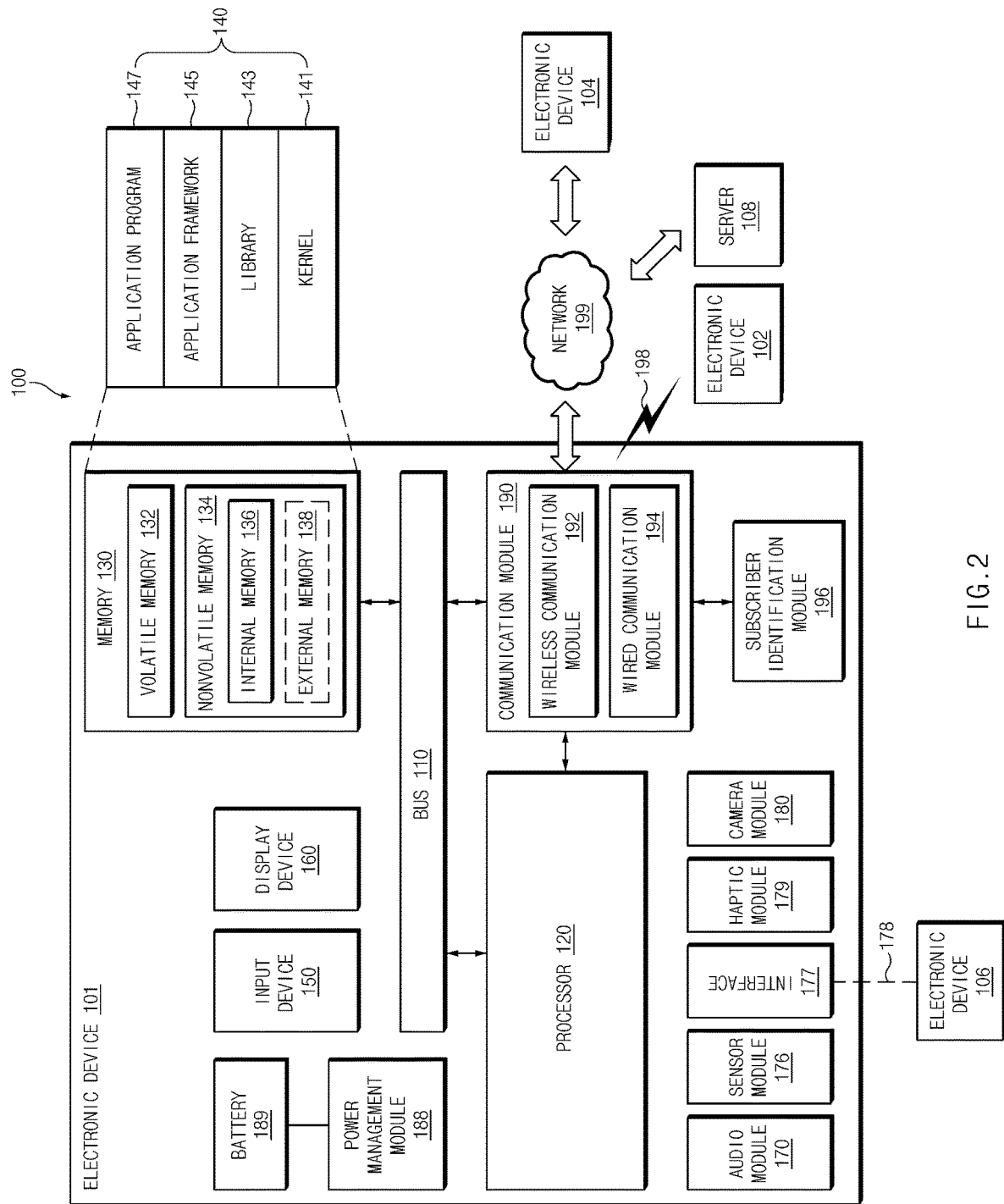
FIG. 2 is a block diagram illustrating an electronic device in a network environment, according to various embodiments.

FIG. 2 is a block diagram illustrating an electronic device in a network environment, according to various embodiments.

Referring to FIG. 2, under a network environment 100, the electronic device 101 may communicate with an electronic device 102 through local wireless communication 198 or may communication with an electronic device 104 or the server 108 through the network 199. According to an embodiment, the electronic device 101 may communicate with the electronic device 104 through the server 108.

According to an embodiment, the electronic device 101 may include a bus 110, a processor 120, a memory 130, an input device 150 (e.g., a microphone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described components or may further include other component(s).

The bus 110 may interconnect the above-described components 120 to 190 and may include a circuit for conveying signals (e.g., a control message or data) between the above-described components. The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application program to control at least one of another component (e.g., hardware or software component) of the electronic device 101 connected to the processor 120 and may process and compute various data. The processor 120 may load a command or data, which is received from at least one of other components (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (Micro-SD), mini secure digital (Mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software component, such as a command or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display device 160.

The display device 160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101.

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 176 may further include a control circuit for controlling at least one or more sensors included therein. According to an embodiment, the sensor module 176 may be controlled by using the processor 120 or a processor (e.g., a sensor hub) separate from the processor 120. In the case that the separate processor (e.g., a sensor hub) is used, while the processor 120 is in a sleep state, the separate processor may operate without awakening the processor 120 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one component of the electronic device 101.

The communication module 190 may establish a communication channel between the electronic device 101 and an external device (e.g., the first external electronic device 102, the second external electronic device 104, or the server 108).

The communication module 190 may support wired communication or wireless communication through the established communication channel. According to an embodiment, the communication module 190 may include a wireless communication module 192 or a wired communication module 194. The communication module 190 may communicate with the external device (e.g., the first external electronic device 102, the second external electronic device 104, or the server 108) through a first network 198 (e.g. a short range communication network such as Bluetooth or infrared data association (IrDA)) or a second network 199 (e.g., a wireless wide area network such as a cellular network) through a relevant module among the wireless communication module 192 or the wired communication module 194.

The wireless communication module 192 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the communication processor may perform at least a portion of functions associated with at least one of components 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, local wireless communication, or a GNSS communication.

The wired communication module 194 may include, for example, a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network (e.g., LAN or WAN), the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108). According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 3:
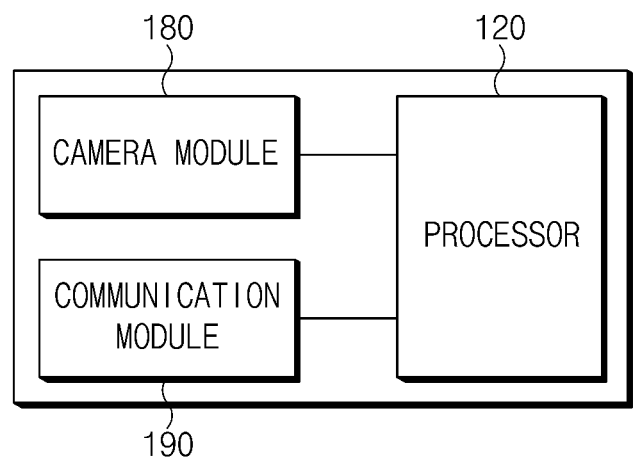
FIG. 3 is a block diagram illustrating a partial configuration of an electronic device according to an embodiment.

FIG. 3 is a block diagram illustrating a partial configuration of an electronic device according to an embodiment.

Referring to FIG. 3, the electronic device 101 may include the camera module 180, the communication module 190, and the processor 120. FIG. 3 illustrates only some components of the electronic device illustrated in FIG. 2 for convenience of description, and the description and other components described with reference to FIG. 2 may also be applied to FIG. 3.

The camera module 180 may include a lens and an image sensor. The lens may collect light incident on the camera module 180 from an outside. The collected light may reach the image sensor through an aperture. The image sensor may receive light incident from an outside through a plurality of unit pixels, and generate an electrical signal in response to the received light. An image may be generated based on the generated electrical signal.

According to an embodiment, the communication module 190 may be connected to an external electronic device to transmit and receive data. For example, the communication module 190 may transmit image information to the external electronic device 108. The communication module 190 may receive information (e.g., attribute information of a light source) about an image from the external electronic device 108.

The processor 120 may control overall operations of the electronic device 101. For example, the processor 120 may control the camera module 180 to obtain an image of an external object and correct the color temperature of the obtained image.

According to an embodiment, the processor 120 may control the camera module 180 to obtain an image of one or more external objects. For example, the processor 120 may obtain a preview image of one or more external objects. In another example, the processor 120 may obtain a captured image of one or more external objects.

According to an embodiment, the processor 120 may recognize an external object specified through the external electronic device (or server) 108. The processor 120 may transmit an image (e.g., a preview image) obtained through the camera module 180 to the external electronic device 108 in a streaming manner, and receive the information about a specified external object included in the image to recognize the specified external object. According to another embodiment, the processor 120 may recognize one or more external objects. The processor 120 may transmit the information (e.g., color information) about the one or more external objects to the external electronic device 108, and receive the information about the specified external object among the recognized one or more external objects from the external electronic device 108 to recognize the specified external object. According to still another embodiment, the processor 120 may recognize the specified external object by using the information (e.g., color information and shape information) about the specified external object. For example, the information about the specified external object may be stored in a memory included in the electronic device 101, or may be received from the external electronic device 108. When the processor 120 recognizes the specified external object directly without passing through the external electronic device 108, the processor 120 may transmit the information (e.g., a type of the external object) about the external object to the external electronic device 108. According to an embodiment, the processor 120 may recognize a plurality of specified external objects.

According to an embodiment, the processor 120 may correct the obtained image. For example, the processor 120 may correct the color temperature of the obtained image. In other words, the processor 120 may correct a white balance WB of the obtained image. The processor 120 may correct an image photographed with various light sources similarly to the image photographed with a reference light source (e.g., standard sunlight having a color temperature of 5500 K). According to an embodiment, the processor 120 may obtain a gain value for correcting the white balance of an image. For example, the processor 120 may obtain an R gain (WB_Rgain) value and a B gain (WB_Bgain) value for correcting the white balance based on the RGB values of the specified area (or unit area). In an embodiment, the processor 120 may calculate the corrected R value R' and B value B' according to following Equation 2.

$$R' = WB\_Rgain * R$$

$$B' = WB\_Bgain * B \qquad \text{[Equation 2]}$$

According to an embodiment, the processor 120 may automatically adjust the white balance of the image. In other words, the electronic device 101 may perform an auto white balance (AWB) function.

According to an embodiment, the processor 120 may correct the white balance of an image by using specified white or gray included in an external object. For example, the processor 120 may obtain the R gain (WB_Rgain) value and the B gain (WB_Bgain) value by using the RGB average values of the specified area (or unit area) on the assumption that the RGB average values of the image are equal to each other.

According to an embodiment, the processor 120 may correct the white balance of an image by recognizing a specified external object. For example, the processor 120 may transmit the image color information of the recognized external object to the external electronic device 108, and receive information necessary for correcting an image through the external electronic device 108 to correct the white balance of the image. For example, the information necessary for correcting the image may be attribute information of a light source of an image for obtaining an R gain (WB_Rgain) value and a B gain (WB_Bgain) value. As another example, the information necessary for correcting an image may be information about an R gain (WB_Rgain) value and a B gain (WB_Bgain) value for correcting the white balance of an image.

According to an embodiment, when there is an external object including specified white or gray, the processor 120 may use an external object including the specified white or gray and at least one of the specified external objects to correct the color temperature of the image. For example, when the external object including the specified white or gray is recognized, the processor 120 may correct the color temperature of the image by using the external object including the specified white or gray, and optionally correct the corrected image by using the specified external object. For example, when the error between the image of which the white balance is corrected by using the external object including the specified white or gray and the image of the external object by the reference light source is greater than or equal to a specified error range, the processor 120 may correct the image by using the specified external object. As another embodiment, when the external object including the specified white or gray is not recognized, the processor 120 may correct the color temperature of the image by using the specified external object.

Figure 4:
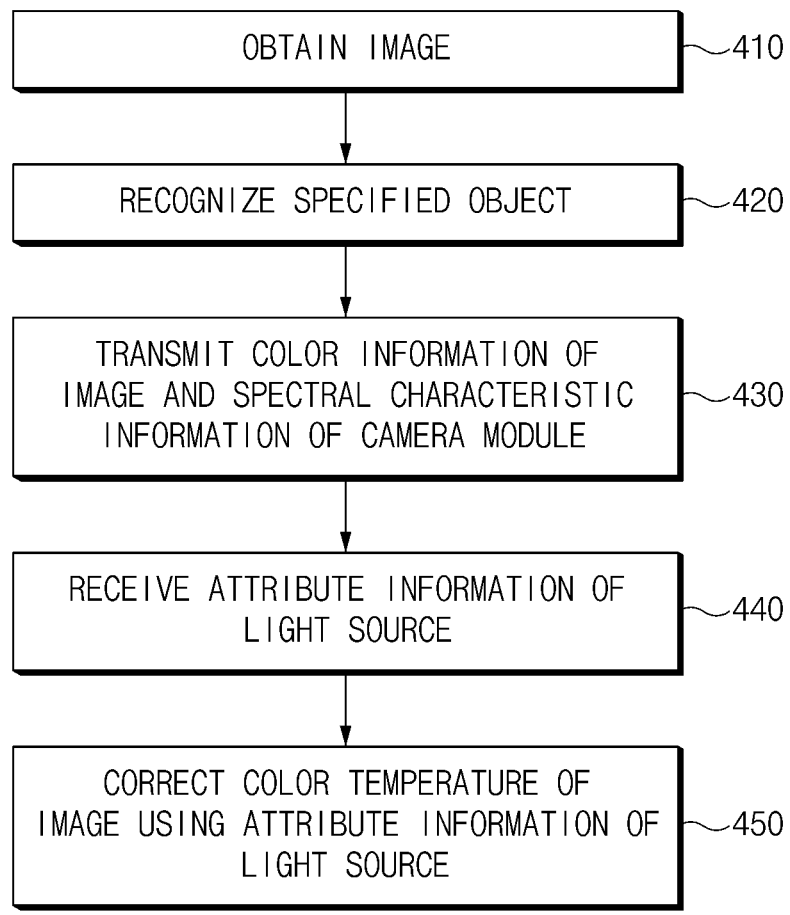
FIG. 4 is a flowchart illustrating a method of correcting a color temperature of an image obtained by an electronic device according to an embodiment.

FIG. 4 is a flowchart illustrating a method of correcting a color temperature of an image obtained by an electronic device according to an embodiment.

According to an embodiment, in operation 410, the electronic device 101 (e.g., the processor 120) may obtain an image of one or more external objects by using the camera module 180. For example, the electronic device 101 may obtain a preview image or a captured image.

According to an embodiment, in operation 420, the electronic device 101 (e.g., the processor 120) may recognize at least one specified external object among one or more external objects. For example, the electronic device 101 may recognize the specified external object by transmitting the information about the obtained image to the external electronic device (or server) 108 and receiving the response thereto.

According to an embodiment, in operation 430, the electronic device 101 (e.g., the processor 120) may transmit the image color information corresponding to the recognized external object through the communication module 190 to the external electronic device 108. For example, the electronic device 101 may transmit the image color information corresponding to the specified external object included in the obtained image to the external electronic device 108. In addition, the electronic device 101 may transmit the spectral characteristic information of the camera module 180 to the external electronic device 108 together with the image color information.

According to an embodiment, in operation 440, the electronic device 101 (e.g., the processor 120) may receive the image color information and the attribute information of the light source for the image determined by using the reference color information corresponding to the at least one specified external object. For example, the reference color information may be the color information of the image obtained by photographing the specified external object with the reference light source. According to an embodiment, the electronic device 101 may receive the attribute information of the light source for the image by using the spectral characteristic information together with the image color information and the reference color information.

According to an embodiment, in operation 450, the electronic device 101 (e.g., the processor 120) may correct the color temperature of the image by using the attribute information of the light source. For example, the electronic device 101 may obtain a gain value for correcting the white balance of the image using the attribute information of the light source, thereby correcting the color temperature of the image.

Accordingly, the electronic device 101 may correct the obtained image by using the attribute information of the light source for the image, similarly to the image photographed with the reference light source.

Figure 5:
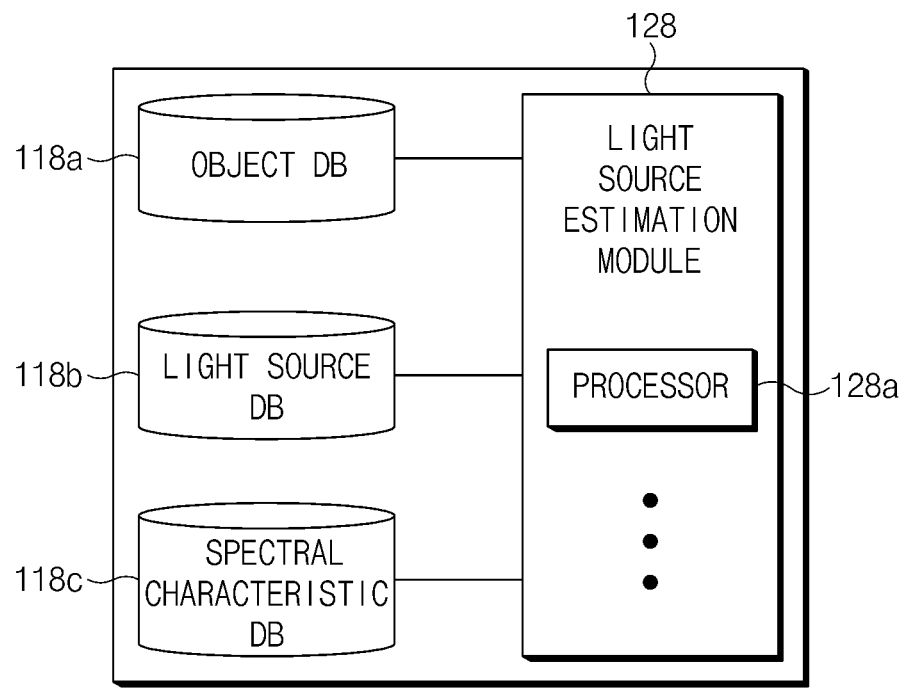
FIGS. 5 and 6 are views illustrating a configuration of an external electronic device and information stored in a database according to an embodiment.
Figure 6:
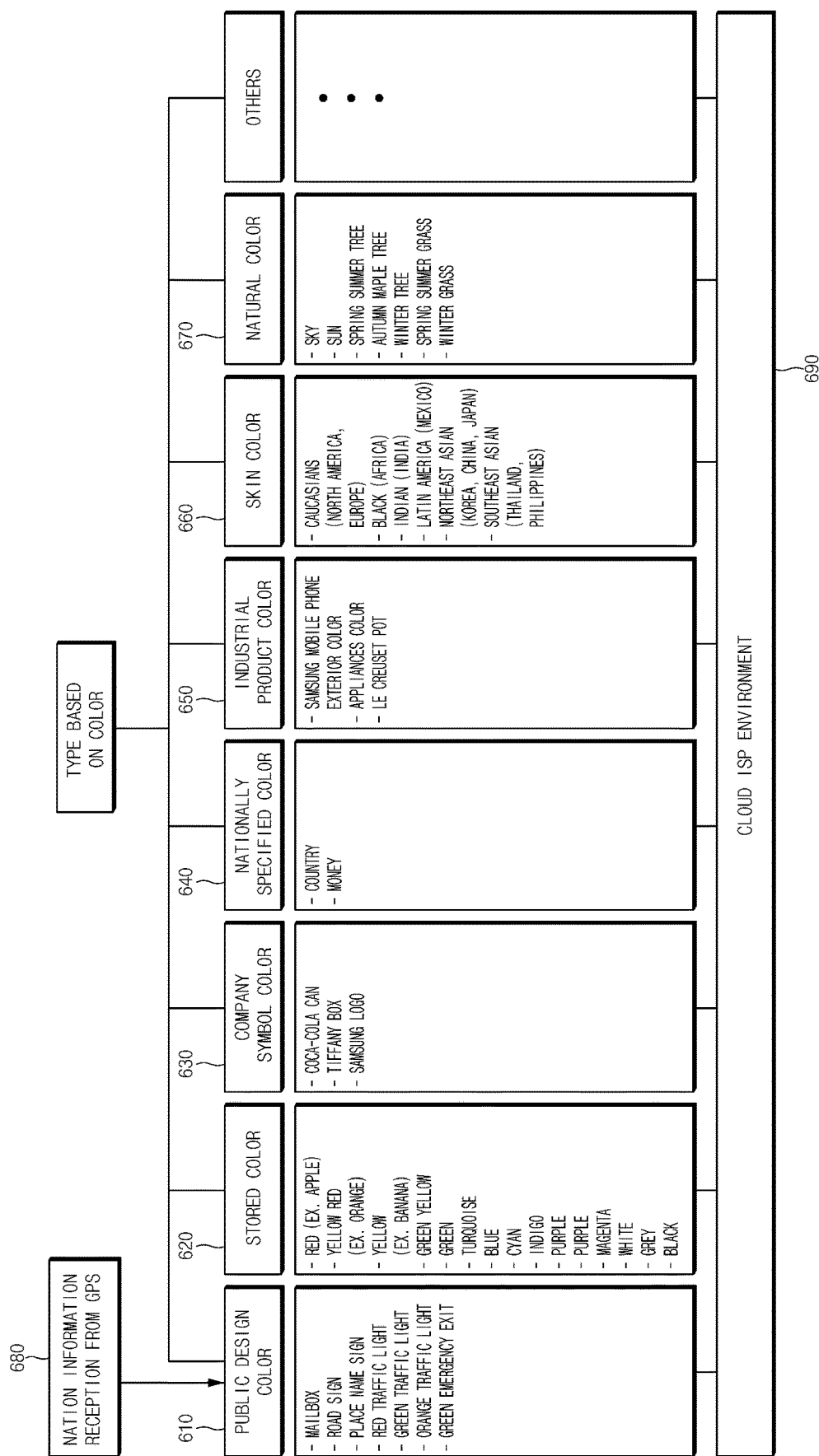

FIGS. 5 and 6 are views illustrating a configuration of an external electronic device and information stored in a database according to an embodiment.

Referring to FIG. 5, the external electronic device (or server) 108 may include an object database 118a, a light source database 118b, a spectral characteristic database 118c, and a light source estimation module 128. In the disclosure, although the external electronic device 108 is described as single server concept for convenience of description, in an embodiment, the external electronic device 108 may correspond to a group of a plurality of servers. For example, the external electronic device 108 may be understood as a concept including an object database server, a light source database server, and a server that performs a light source estimation function.

The object database 118a may store information about the specified external object. The specified external object may be an object having high color stability. The specified external objects may have the same color (or very similar to) as that between the same objects. For example, the specified external object may be an external object in which the color deviation is managed quantitatively with a color-specified design value. In other words, the specified external object may be an external object corresponding to color information within an error range specified based on color information that surface colors of external objects identical to each other correspond to a specified color. For example, the specified external object may be a nationally managed public design facility (e.g. a mailbox, a sign, a traffic light, a hazard, a safety sign, or a festival sign), a nationally colored object (e.g., a national flag or currency), a symbol of a company (e.g., Coca-Cola can, a Tiffany box, or Samsung's logo), or commercial goods (e.g., smartphones, appliances or tableware).

According to an embodiment, the object database 118a may store reference color information of the specified external object. For example, the reference color information may be color information of an image obtained by photographing a specified external object with a reference light source. In other words, the reference color information may include a trademark, a normalized color, or unique color information corresponding to a standardized color included in a specified external object. In addition, the object database 118a may store shape information for recognizing the specified external object.

According to an embodiment, the object database 118a may additionally store information about a reliability index (RI) obtained by evaluating the specified external object based on specified criteria. For example, the reliability index may be calculated by following Equation 3.

$$RI = C1*W1 + C2*W2 + C3*W3 + C4*W4 + C5*W5 \qquad \text{[Equation 3]}$$

In Equation 3, C1, C2, C3, C4, and C5 are different specified criteria. W1, W2, W3, W4, and W5 are weights of specified criteria. In other words, the weight may be determined according to the priority of the specified criteria. For example, the specified criteria may include at least one of color stability, AWB suitability, and recognizability. The color stability may be an index for evaluating the similarity between colors of the same objects. The color stability may be calculated by at least one of a state in which the color is accurately expressed (or, color expression accuracy) and a discoloring possibility (or a degree of damage of the color). The AWB suitability may be an index that evaluates how accurate and sufficient information is included to adjust the white balance. The AWB suitability may be calculated based on the degree at which the specified color (e.g., white) is included in an object. The recognition accuracy may be an index that evaluates the degree at which the object is recognized quickly and accurately. The recognition accuracy may be calculated by at least one of shape specificity, recognized size, shape variation, and pattern complexity. The accuracy of the recognition may be high when the shape is unusual, the recognized size is large, the shape variation is small, and the pattern is not complicated.

According to an embodiment, the object database 118a may store information on the specified external object while being divided according to the type based on the color of the specified external object. For example, referring to FIG. 6, the object database 118a may separate and store information about one of a color of public design 610, a stored color 620, a corporate symbolic color 630, a nationally designated color (e.g., color standard of ISO international standards organization, color standard of ANSI US standards association, color standard according to OSHA US occupational safety and health act, color standard of EU-OSHA European occupational safety and health agency, color standard according to Korean industrial standards) 640, a commercial product color 650, a skin color (e.g., whites, blacks, or Asians) 660 and a natural color (e.g., sky, sun, trees, or grass) 670. For example, the external electronic device 108 may determine the country where the electronic device 101 is located based on location information such as GPS of the electronic device 101, and determine (or use) the color 610 of the public goods corresponding to the country. According to an embodiment, the information about an external object stored in the object database 118a may be connected to the cloud ISP environment and used to recognize a specified object. In this case, the cloud ISP environment may refer to a cloud environment that may be implemented by the external electronic device 108.

The light source database 118b may store information about a plurality of light sources. For example, the information about the light source may be information about light emitting spectral intensity according to the wavelength. According to an embodiment, the light source database 118b may store information about the light source according to the type of the light source. For example, referring to following Table 1, the light source database 118b may store information about an artificial light source and information about a natural light source. For example, the information about the artificial light source may include information about a candle, an incandescent lamp, a fluorescent lamp, and a light emitting diode (LED) according to a color temperature. For example, the information about the natural light source may include information about sunlight by time zone or sunlight by weather depending on the color temperature.

TABLE 1

| | | | |
|---|---|---|---|
| Indoor artificial light source by color temperature | | | |
| 1 | ~2000 | K | Candlelight |
| 2 | 2000~2500 | K | Incandescent light |
| 3 | 2500~3000 | K | Household tungsten |
| 4 | 2600~3150 | K | Tungsten |
| 5 | 3000~3500 | K | Fluorescent soft white |
| 6 | 3200~3700 | K | Fluorescent warm white |
| 7 | 3900~4500 | K | Fluorescent white |
| 8 | 4600~5400 | K | Fluorescent day white |
| 9 | 5700~7100 | K | Fluorescent daylight |
| 10 | 2600~3700 | K | LED warm white |
| 11 | 3700~5000 | K | LED neutral white |
| 12 | 5000~10000 | K | LED cool white |
| Outdoor natural light source by color temperature | | | |
| 13 | 2000~3000 | K | Sunlight at Sunrise/Sunset |
| 14 | 3500 | K | Sunlight 1 hour after sunrise and 1 hour before sunset |
| 15 | 4000~4500 | K | Sunlight from 10am to 3pm |
| 16 | 4000~4800 | K | Outdoor sunlight at morning and evening |
| 17 | 5000~5500 | K | Sunlight at noon |
| 18 | 5500~6500 | K | Daylight average |
| 19 | 6500~7000 | K | Cloudy day, sunny day and sunlight in shady place |
| 20 | 7500~8400 | K | Very cloudy day, and sunlight on misty day |
| 21 | 10000~20000 | K | north sky in Sunny day and snowy field in sunny day |
| 22 | 20000~27000 | K | Blue sky reflected in water |

The spectral characteristic database 118c may store the spectral characteristic information of the electronic device 101. For example, the spectral characteristic database 118c may store the spectral characteristic information for each type (e.g., model name, or ID) of the electronic device 101. According to an embodiment, the spectral characteristic database 118c may store the spectral characteristic information received from the electronic device 100. The spectral data of an image sensor may be derived from the spectral characteristic information and used to calculate an RGB value.

The light source estimation module 128 may recognize the specified external object by using the information stored in the object database 118a. For example, the light source estimation module 128 may receive an obtained image of at least one external object from the electronic device 101 in a streaming manner, and recognize a specified external object included in the photographed image by using information about the specified external object. As another example, the light source estimation module 128 may receive information about one or more external objects recognized from the electronic device 101, and recognize at least one of the one or more external objects as the specified external object. According to an embodiment, the light source estimation module 128 may recognize the specified external object by using the reference color information of the specified external object and the information about at least one of shapes of the specified external object.

According to an embodiment, the light source estimation module 128 may transmit the information about the recognized external object to the electronic device 101. According to an embodiment, the light source estimation module 128 may recognize a plurality of specified external objects.

According to an embodiment, the light source estimation module 128 may recognize at least one specified external object by using a reliability index of the plurality of recognized specified external objects. For example, the light source estimation module 128 may select an external object having a reliability index that is equal to or greater than a specified index from the at least one specified external object according to the reliability index of the specified external object.

According to an embodiment, the light source estimation module 128 may estimate the light source of the image using information stored in the object database 118a and the light source database 118b.

According to an embodiment, the light source estimation module 128 may obtain simulation color information corresponding to the selected light source by using the reference color information of the recognized external object. For example, the simulation color information may be color information obtained by using one light source selected from light sources stored in the light source database 118b. According to an embodiment, the light source estimation module 128 may obtain the simulation color information by additionally using the spectral characteristic information of the camera module 180 of the electronic device 101 received or stored in the spectral characteristic database 118c. Thus, the light source estimation module 128 may calculate the simulation color information $R_S$, $G_S$, and $B_S$ of the specified external object by following Equation 4.

$$R_S k * \int L_S(\lambda) * R(\lambda) * \bar{r}(\lambda) d\lambda$$

$$G_S k * \int L_S(\lambda) * R(\lambda) * \bar{g}(\lambda) d\lambda$$

$$B_S k * \int L_S(\lambda) * R(\lambda) * * \bar{b}(\lambda) d\lambda \quad \text{[Equation 4]}$$

In Equation 4, the $L_S(\lambda)$ is spectral intensity according to the wavelength of the selected light source. The R ($\lambda$) may be a surface spectral reflectance of the specified external object. For example, the surface spectral reflectance may be obtained through the reference color information of the specified external object. The $\bar{r}(\lambda)$, $\bar{g}(\lambda)$ and $\bar{b}(\lambda)$ may be the camera spectral sensitivity of the camera module of the electronic device 101. The k may be a normalization constant. Accordingly, the light source estimation module 128 may obtain the simulation color information (e.g., an RGB value) of the specified external object for the selected light source.

According to an embodiment, the light source estimation module 128 may estimate the light source for the received color information by comparing the obtained simulation color information with the image color information received from the electronic device 101. For example, the light source estimation module 128 may calculate a difference value (or distance) D between the received color information and the simulation color information by using following Equation 5.

$$D = \sqrt{\left(\frac{R_s}{G_s} - \frac{R_r}{G_r}\right)^2 + \left(\frac{B_s}{G_s} - \frac{B_r}{G_r}\right)^2} \quad \text{[Equation 5]}$$

In Equation 5, the $R_s$, $G_s$ and $B_s$ may be RGB values of the simulation color information. The $R_r$, $G_r$ and $B_r$ may be RGB values of the received color information. According to an embodiment, the light source estimation module 128 may determine the selected light source as a light source (or an estimated light source) for the received color information when the obtained difference value is within a specified range. According to an embodiment, the light source estimation module 128 may determine the light source having the smallest difference value as the estimated light source when there are a plurality of light sources having the obtained difference value within a specified range. In this case, the specified range may correspond to the smallest difference value among previously obtained difference values. In other words, when a difference value smaller than the previously obtained difference value is obtained, the specified range is changed dynamically. When the small difference value is not obtained anymore, the external electronic device 108 may determine the selected light source corresponding to a current difference value as the estimated light source.

According to an embodiment, the light source estimation module 128 may transmit information about the determined light source to the electronic device 101. For example, the light source estimation module 128 may transmit attribute information of the determined light source to the electronic device 101. As another example, the light source estimation module 128 may obtain a gain value for correcting an image based on the attribute information of the light source and transmit the gain value to the electronic device 101.

According to an embodiment, the light source estimation module 128 may include a processor 128a for executing an operation of estimating a light source. For example, the light source estimation module 128 may include a plurality of processors for performing respective operations for estimating a light source. For example, each of the plurality of processors may perform some operations and transfer the result to another processor.

Figure 7:
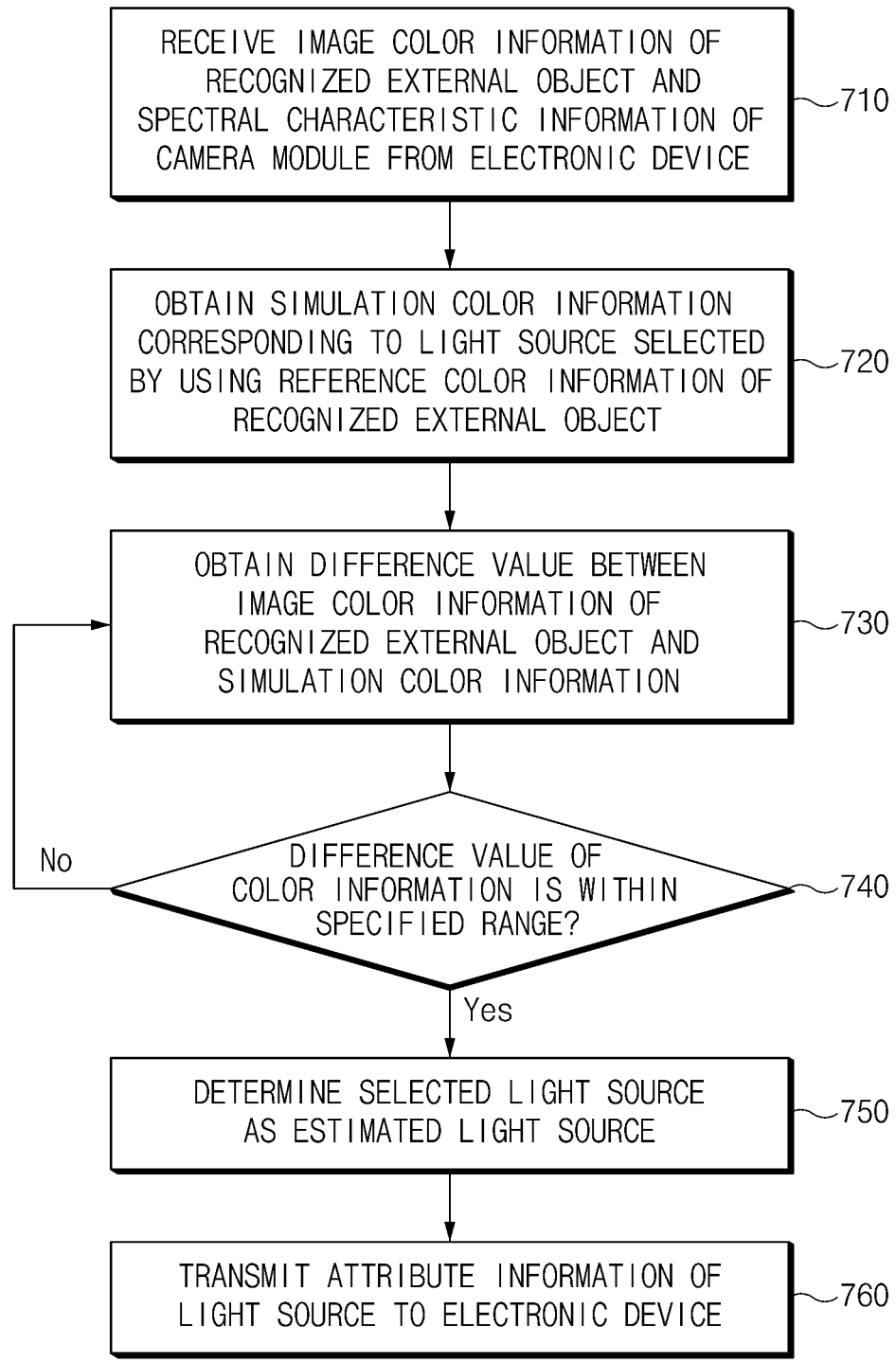
FIG. 7 is a flowchart illustrating a method of estimating a light source for an image obtained from an electronic device by an external electronic device according to an embodiment.

FIG. 7 is a flowchart illustrating a method of estimating a light source for an image obtained from an electronic device by an external electronic device according to an embodiment.

According to an embodiment, in operation 710, the external electronic device (or server) 108 (e.g., the processor 128a) may receive image color information of the recognized external object. The electronic device 101 may recognize the specified external object through the external electronic device 108 and transmit the image color information of the recognized external object to the external electronic device 108. According to an embodiment, the external electronic device 108 may receive spectral characteristic information of the camera module 180.

According to an embodiment, in operation 720, the external electronic device 108 (e.g., the processor 128a) may obtain simulation color information corresponding to the selected light source using reference color information of the recognized external object. The external electronic device 108 may select one light source among the plurality of light sources stored in the light source database 118b and obtain the simulation color information by using the surface spectral reflectance obtained through the reference color information.

According to an embodiment, in operation 730, the external electronic device 108 (e.g., the processor 128a) may obtain a difference value between the image color information of the recognized external object and the simulation color information.

According to an embodiment, in operation 740, the external electronic device 108 (e.g., the processor 128a) may determine whether the difference value is within a specified range. For example, when the difference value is not within the specified range, the external electronic device 108 may select another light source among the plurality of light sources stored in the light source database 108b and obtain the simulation color information again (720).

According to an embodiment, in operation 750, the external electronic device 108 (e.g., the processor 128a) may determine the selected light source as an estimated light source when the difference value is within the specified range.

According to an embodiment, in operation 760, the external electronic device 108 (e.g., the processor 128*a*) may transmit the information about the estimated light source to the electronic device 101. The information about the estimated light source may be the attribute information of the light source or a gain value (e.g., a gain value for correcting the white balance of an image) obtained based on the attribute information. Thus, the electronic device 101 may receive the information about the determined light source and correct the color temperature of the obtained image.

According to an embodiment, the electronic device 101 may perform a method of correcting a white balance through a specified external object in addition to a method of correcting a white balance of an image by using specified white or gray. For example, the electronic device 101 may determine whether there is an external object including specified white or gray among in one or more external objects, and correct the white balance of the image by using the specified white or gray. According to an embodiment, when there is no external object including the specified white or gray, the electronic device 101 may recognize at least one of the one or more specified external objects. The electronic device 101 may correct the color temperature of the image by using the specified external object. According to an embodiment, the electronic device 101 may correct the white balance of the image by using the specified or gray, and additionally recognize the specified external object, thereby reducing the error rate and efficiently correcting the white balance of the image.

Figure 8:
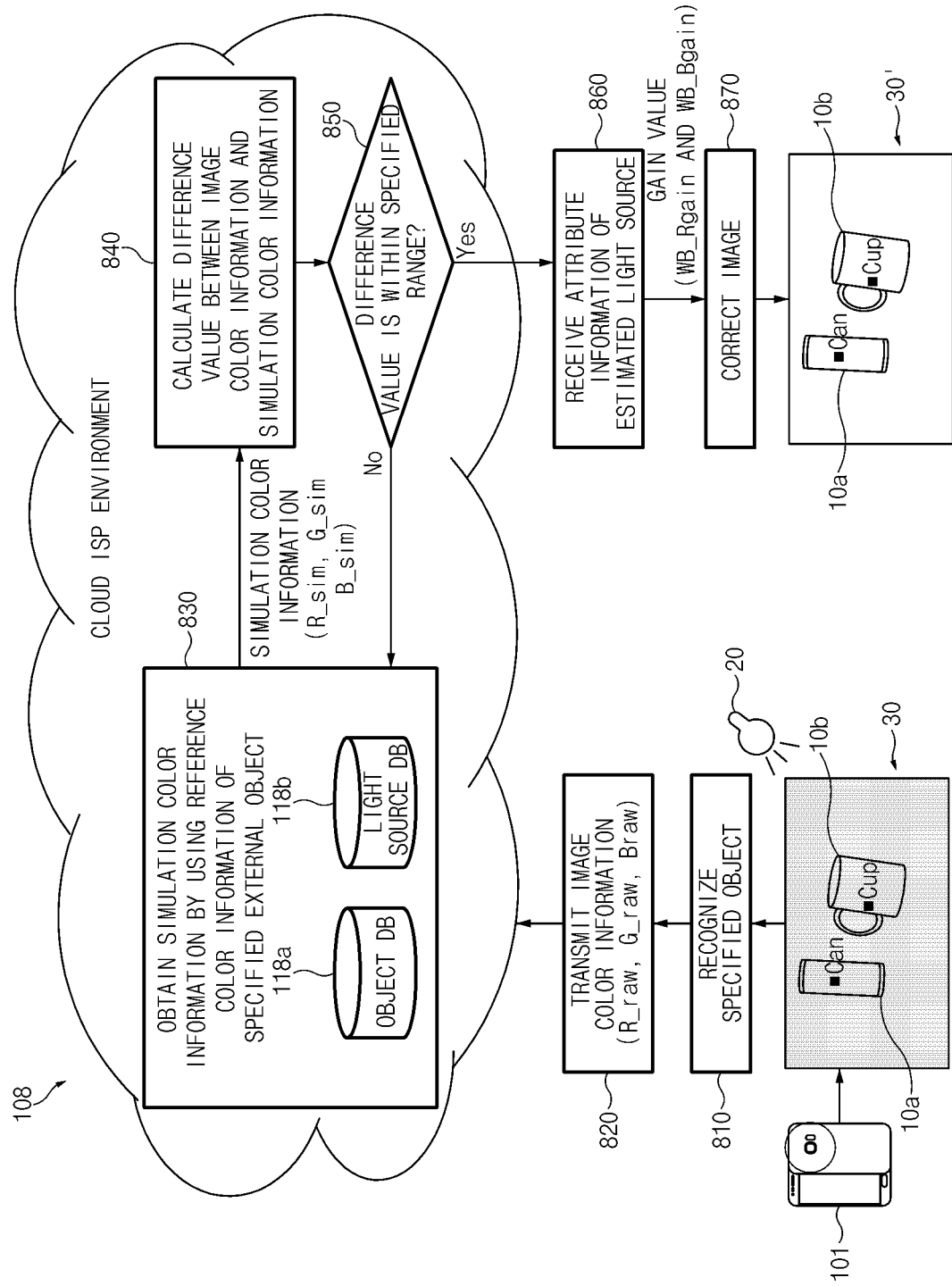
FIG. 8 is a view illustrating a method of processing an image in an image processing system according to an embodiment.

FIG. 8 is a view illustrating a method of processing an image in an image processing system according to an embodiment.

Referring to FIG. 8, the electronic device 101 may obtain information for correcting an image through a cloud ISP environment that may be provided through the external electronic device (or a server) 108.

According to an embodiment, the electronic device 101 may obtain an image 30 by photographing one or more external objects under the light source 20. The obtained image may include an image of a specified external object. This process may correspond to operation 410 of FIG. 4.

According to an embodiment, in operation 810, the electronic device 101 may recognize a specified external object. The specified external object may be a Coca-Cola can 10*a* and a cup 10*b* including a stored color. The specified color may be, for example, a color according to pantone color. This process may correspond to operation 420 of FIG. 4.

According to an embodiment, in operation 820, the electronic device 101 may transmit color information about the specified external object to the external electronic device 108. For example, the electronic device 101 may transmit the color information (R_raw, G_raw and B_raw) of the Coca-Cola can 10*a* and the cup 10*b* including the specified color to the external electronic device 108. This process may correspond to operation 430 of FIG. 4 and operation 710 of FIG. 7.

According to an embodiment, in operation 830, the external electronic device 108 may obtain simulation color information by using reference color information of the specified external object. For example, the external electronic device 108 may obtain the simulation color information R_sim, G_sim, and B_sim for the selected light source by using the reference color information of the Coca-Cola can 10*a* and the cup 10*b* including the specified color. The reference color information and the information about the selected light source may be obtained from the object database 118*a* and the light source database 118*b*. This process may correspond to operation 720 of FIG. 7.

According to an embodiment, in operation 840, the external electronic device 108 may obtain a difference value between the received image color information of the external object and the obtained simulation color information. For example, the distance between the image color information R_raw, G_raw and B_raw of the Coca-Cola can 10*a* and the cup 10*b* including the specified color and the simulation color information R_sim, G_sim and B_sim may be obtained. This process may correspond to operation 730 of FIG. 7.

According to an embodiment, in operation 850, the external electronic device 108 may determine whether the obtained difference value is within a specified range. When the difference value is not within the specified range, the external electronic device 108 may select another light source to obtain the simulation color information again. When the difference value is within the specified range, the external electronic device 108 may determine the selected light source as an estimated light source and transmit the information about the estimated light source to the electronic device 101. This process may correspond to operations 740, 750, and 760 of FIG. 7.

According to an embodiment, in operation 860, the electronic device 101 may receive the attribute information of the estimated light source. The electronic device 101 may obtain the gain values WB_Rgain and WB_Bgain calculated based on the attribute information. This process may correspond to operation 440 of FIG. 4.

According to an embodiment, in operation 870, the electronic device 101 may correct an image by using the obtained gain values WB_Rgain and WB_Bgain. For example, the electronic device 101 may output the corrected image 30' of the Coca-Cola can 10*a* and the cup 10*b* including the specified color. This process may correspond to operation 450 of FIG. 4.

Accordingly, the electronic device 101 may recognize a specified external object by using a mass database of a cloud ISP environment, and may correct the image by estimating a light source for the obtained image.

According to another embodiment, when the electronic device 101 has sufficient processing power and memory, the electronic device 101 may perform an operation of the external electronic device 108. For example, the electronic device 101 may directly recognize the specified external object by using information about the external object stored in a memory, infer the light source for the obtained image by using the reference color information and the light source information stored in the memory, and obtain the gain value by using the estimated attribute information of the light source, thereby correcting the image. According to an embodiment, when the information about the external object, the reference color information, and the light source information are not stored in the memory, the electronic device 101 may receive necessary information from the external electronic device 108.

Figure 9:
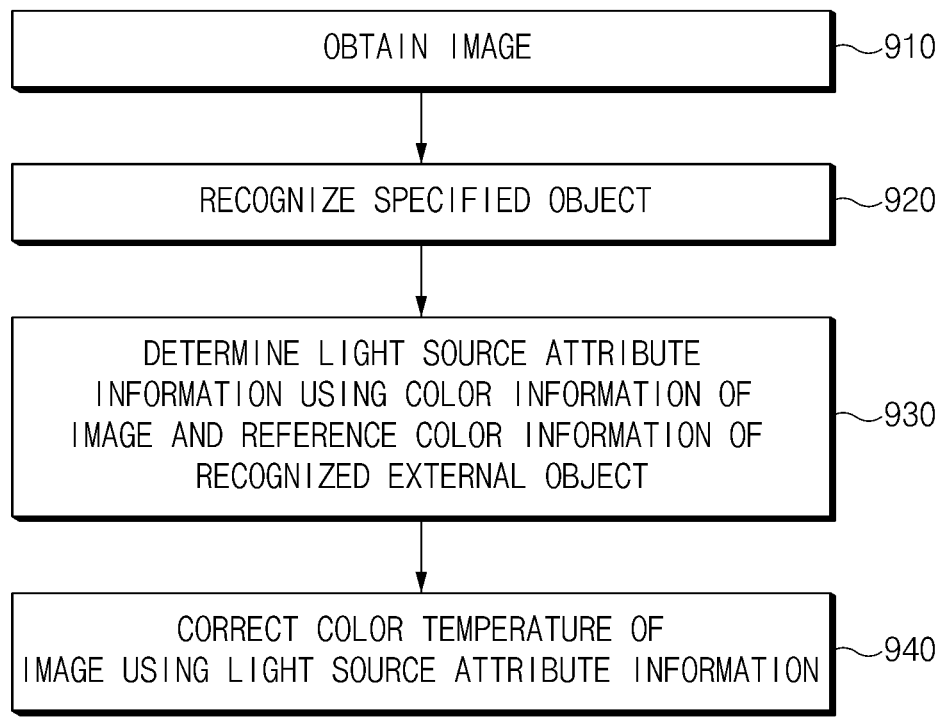
FIG. 9 is a flowchart illustrating a method of correcting a color temperature of an image by an electronic device according to an embodiment.

FIG. 9 is a flowchart illustrating a method of correcting a color temperature of an image by an electronic device according to an embodiment.

Referring to FIG. 9, the electronic device 101 may determine attribute information of a light source of an image to recognize a specified external object and correct a color temperature of the image.

According to an embodiment, in operation 910, the electronic device 101 (e.g., the processor 120) may obtain an image of one or more external objects by using the camera module 180.

According to an embodiment, in operation 920, the electronic device 101 (e.g., the processor 120) may recognize at least one specified external object among one or more external objects.

According to an embodiment, in operation 930, the electronic device 101 (e.g., the processor 120) may determine the attribute information of the light source of the image by using the color information of the image corresponding to the recognized external object and the reference color information of the recognized external object. For example, the electronic device 101 may use the reference color information of the recognized external object stored in the memory or receive the reference color information of the recognized external object from the external electronic device 108.

According to an embodiment, in operation 940, the electronic device 101 (e.g., the processor 120) may correct the color temperature of the image by using the light source attribute information.

Figure 10A:
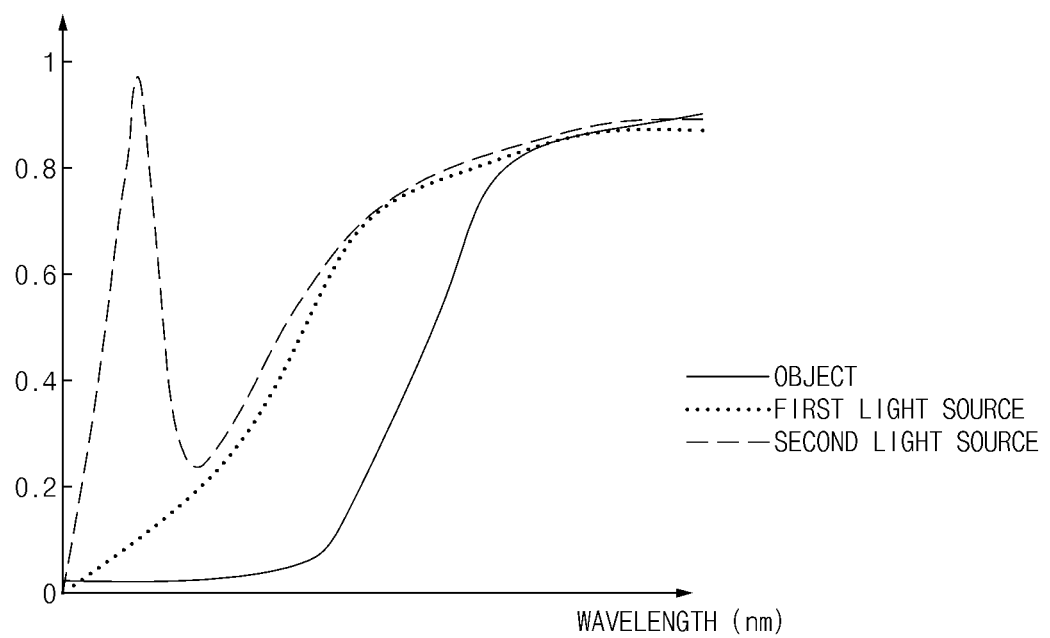
FIGS. 10A and 10B are graphs illustrating a method of distinguishing, by an external electronic device, a light source including different spectral distributions with respect to a specified external object according to an embodiment.
Figure 10B:
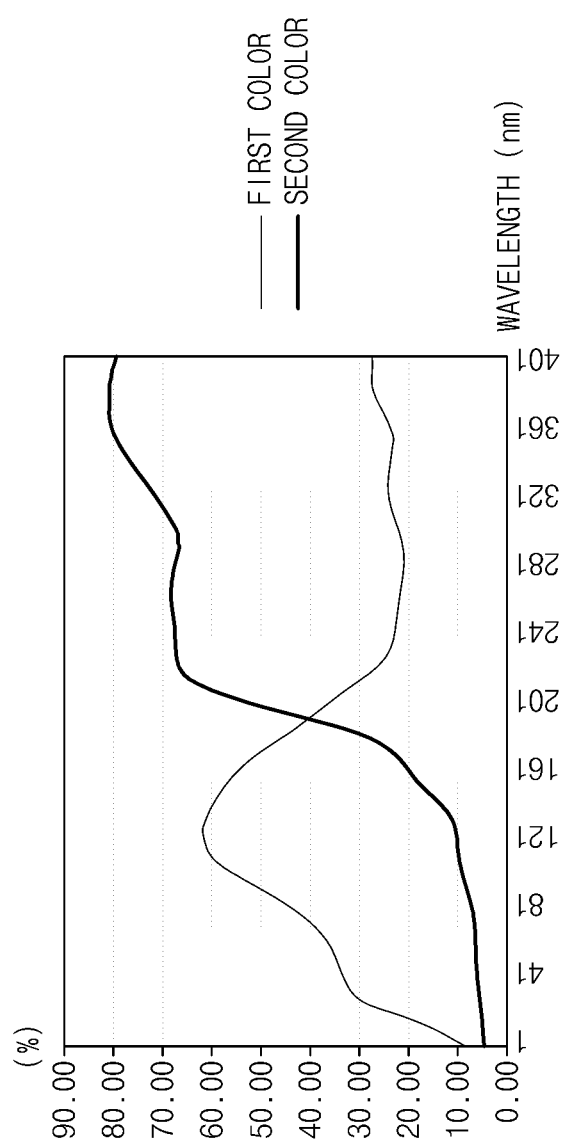

FIGS. 10A and 10B are graphs illustrating a method of distinguishing, by an external electronic device, a light source including different spectral distributions with respect to a specified external object according to an embodiment.

Referring to FIG. 10A, when the spectral distributions of a specified object by a plurality of light sources including different spectral distributions are the same, the electronic device 101 may estimate different light sources as light sources for the obtained image. For example, when the surface spectral reflectance of the specified external object is concentrated at a wavelength in a specified range, it may be difficult for the electronic device 101 to distinguish the plurality of light sources (e.g., first and second light source) having a similar spectral distribution at a wavelength in the specified range.

Referring to FIG. 10B, the electronic device 101 may recognize a specified external object including a plurality of colors (e.g., the first and second colors) having surface spectral reflectances greater than a specified ratio in different wavelength bands. For example, the electronic device 101 may recognize one specified external object including the plurality of colors. As another example, the electronic device 101 may recognize a plurality of specified external objects each including the plurality of colors. Thus, the electronic device 101 may accurately estimate the light source for the obtained image.

Figure 11:
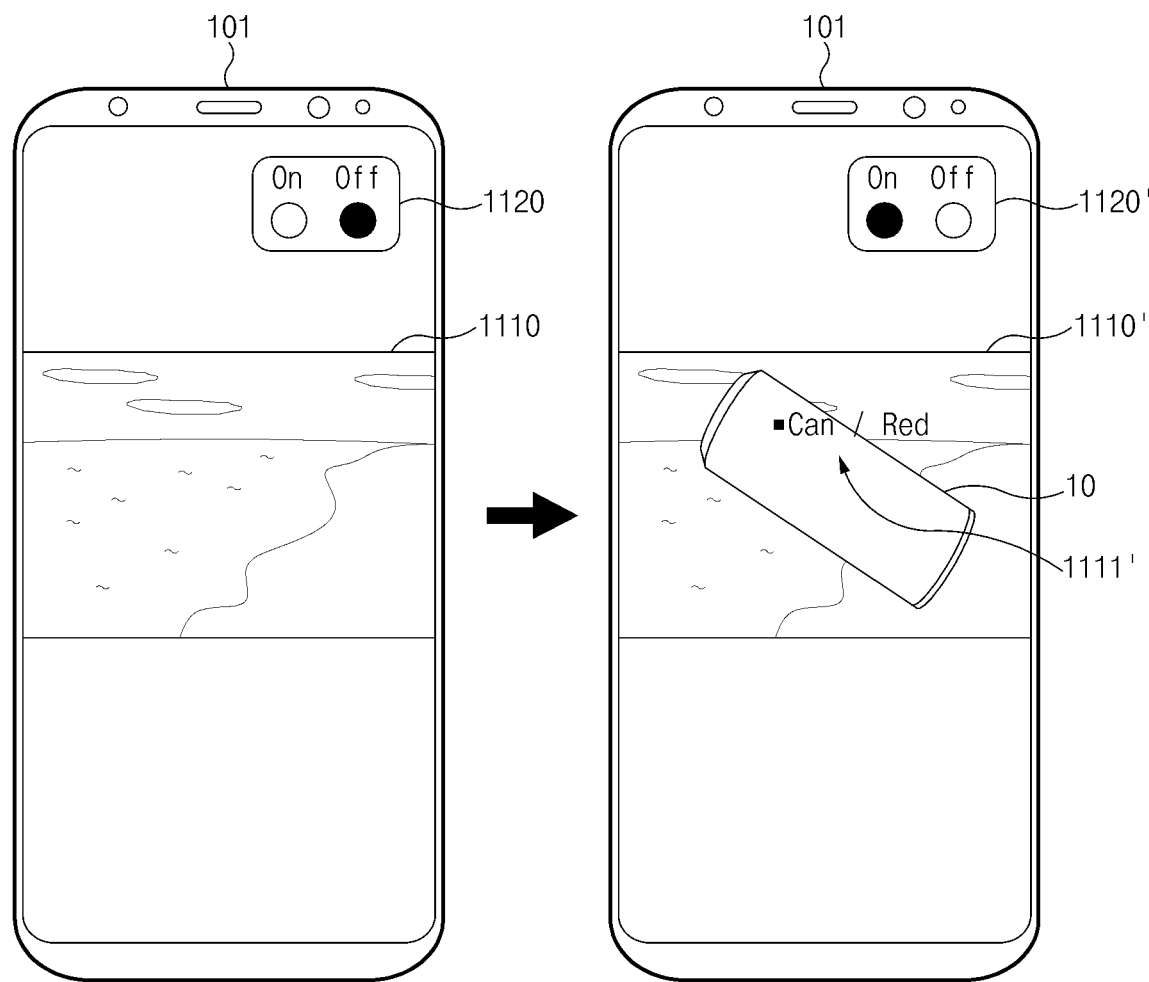
FIG. 11 is a view illustrating a user interface displayed on a display of an electronic device according to an embodiment.

FIG. 11 is a view illustrating a user interface displayed on a display of an electronic device according to an embodiment.

Referring to FIG. 11, the electronic device 101 may display whether to execute a function of correcting an image through a user interface (UI).

According to an embodiment, when an obtained image 1110 does not include the image of a specified external object, the electronic device 101 may turn off a processing function of correcting the color temperature of the image. The electronic device 101 may display through a UI 1120 that the processing function of correcting the image is turned off.

According to an embodiment, when the obtained image 1110 includes the image of the specified external object (e.g., the Coca-Cola can) 10, the electronic device 101 may turn on the processing function of correcting a color temperature of an image. The electronic device 101 may display through the UI 1120' that the processing function of correcting an image is turned on.

According to an embodiment, the electronic device 101 may display information (e.g., can/red) 1111' about the recognized external object on the image (or a preview image).

According to an embodiment, the electronic device 101 may turn on or off a function of correcting an image by receiving a user input through the UIs 1120 and 1120'. For example, the electronic device 101 may turn on or off the function of correcting an image by receiving a user touch input through the UI 1120.

According to the embodiments described with reference to FIGS. 1 to 11, the electronic device 101 may recognize the specified external object and obtain the attribute information of the light source for the obtained image by comparing the color information of the recognized external object with the reference color information. By obtaining the gain value for correcting the color temperature of an image by using the attribute information of a light source, an image whose color information is changed by a light source may be corrected as an image photographed with the reference light source even when a specific color is not recognized. The electronic device 101 may obtain the gain value more clearly for correcting the color temperature of the obtained image by recognizing the plurality of specified external objects.

In addition, when the specified external object is recognized and the attribute information of the light source for the obtained image is obtained, the electronic device 101 may use the information about the accumulated external object and the light source in the database of the external electronic device (or the server) 108, thereby obtaining the gain value for correcting quickly and clearly the color temperature of the image.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 130).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory) in the form of a program module. The instruction, when executed by a processor (e.g., the processor), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
a camera module;
a communication module; and
a at least one processor electrically connected to the camera module and the communication module,
wherein the at least one processor is configured to:
obtain an image of one or more external objects using the camera module;
recognize at least one specified external object among the one or more external objects;
transmit image color information corresponding to the recognized at least one specified external object to an external electronic device using the communication module;
receive, from the external electronic device, attribute information of a light source for the image determined by using spectral characteristic information corresponding to the camera module, the image color information and reference color information corresponding to the at least one specified external object; and
correct a color temperature of the image by using the attribute information received from the external electronic device.

2. The electronic device of claim 1, wherein the specified external object includes an external object with surface colors, wherein the surface colors corresponds to a color within a specified error range from color information.

3. The electronic device of claim 1, wherein the at least one processor is configured to display information about the recognized at least one external object on the obtained image.

4. The electronic device of claim 1, wherein the at least one processor is configured to:
transmit the spectral characteristic information corresponding to the camera module to the external electronic device.

5. The electronic device of claim 1, wherein the reference color information includes a trademark included in the at least one specified external object, a normalized color, or unique color information corresponding to a standardized color.

6. The electronic device of claim 1, wherein the at least one processor is configured to:
determine whether an external object including a specified white or a specified gray exists among the one or more external objects; and
recognize the at least one specified external object among the one or more external objects when the external object including the specified white or the specified gray does not exist.

7. The electronic device of claim 4, wherein the at least one processor is configured to correct the color temperature of the image by using the external object including the specified white or a specified gray and at least one of the specified external objects when the external object including the specified white or the specified gray exists.

8. The electronic device of claim 7, wherein the at least one processor is configured to correct the color temperature of the image by using the external object including the specified white or the specified gray and selectively correct the corrected image by using the specified external object when the external object including the specified white or the specified gray is recognized.

9. An electronic device comprising:
a camera module;
a communication module; and
a processor electrically connected to the camera module and the communication module,
wherein the processor is configured to:
obtain an image of one or more external objects using the camera module;
recognize at least one specified external object among the one or more external objects using a reliability index obtained by evaluating the specified external object based on a specified criteria;
transmit image color information corresponding to the recognized at least one specified external object to an external electronic device using the communication module;
receive, from the external electronic device, attribute information of a light source for the image determined by using the image color information and reference color information corresponding to the at least one specified external object; and correct a color temperature of the image by using the attribute information received from the external electronic device.

10. The electronic device of claim 9, wherein the at least one processor is configured to select an external object having a specified index or more among the at least one specified external object based on the reliability index of the specified external object, and recognize the selected external object.

11. The electronic device of claim 9, wherein the specified criteria includes at least one of color stability, AWB suitability and recognisibility.

12. The electronic device of claim 1, wherein the at least one processor is configured to recognize the at least one specified external object including a plurality of colors having a spectral reflectance of a specified ratio or more in different wavelength bands.

13. A method of correcting a color temperature of an image, the method comprising:
  obtaining an image of one or more external objects by using a camera module;
  recognizing at least one specified external object among the one or more external objects;
  transmitting image color information corresponding to the recognized at least one specified external object to the external electronic device through a communication module;
  receiving, from the external electronic device, attribute information of a light source for the image determined by using spectral characteristic information corresponding to the camera module, the image color information and reference color information corresponding to the at least one specified external object; and
  correcting a color temperature of the image by using the attribute information.

14. The method of claim 13, further comprising:
  transmitting the spectral characteristic information corresponding to the camera module to the external electronic device.

15. The method of claim 13, wherein the correcting of the color temperature of the image includes:
  correcting the color temperature of the image by using at least one of image information of an external object including a specified white or a specified gray and the attribute information when the external object including the specified white or the specified gray exists.

* * * * *